United States Patent [19]

Matsuura

[11] Patent Number: 5,394,307
[45] Date of Patent: Feb. 28, 1995

[54] PHOTOGRAPHIC FLASH DEVICE

[75] Inventor: Keisuke Matsuura, Tokyo, Japan

[73] Assignee: Olympus Optical Co., Ltd., Tokyo, Japan

[21] Appl. No.: 68,624

[22] Filed: May 27, 1993

[30] Foreign Application Priority Data

Jun. 8, 1992 [JP] Japan .................. 4-147569

[51] Int. Cl.⁶ .......................................... G03B 15/02
[52] U.S. Cl. .................................. 362/16; 362/217; 362/298; 362/349; 362/263
[58] Field of Search ............... 362/17, 3, 16, 217, 362/263, 297, 298, 347, 349, 346

[56] References Cited

U.S. PATENT DOCUMENTS

| | | | |
|---|---|---|---|
| 3,484,597 | 12/1969 | Schmidt | 362/217 |
| 4,141,057 | 2/1979 | Dietrich et al. | 362/346 |
| 4,156,890 | 5/1979 | Herbert et al. | 362/16 |
| 4,179,726 | 12/1979 | Aron | 362/17 |
| 4,404,618 | 9/1983 | Yamada et al. | 362/17 |
| 5,047,900 | 9/1991 | DiRisio | 362/16 |
| 5,154,503 | 10/1992 | Sternsher | 362/16 |

FOREIGN PATENT DOCUMENTS 0245237 10/1987 Japan .................. 362/16
48934 6/1990 Japan .

Primary Examiner—Ira S. Lazarus
Assistant Examiner—Sara Sachie Raab
Attorney, Agent, or Firm—Louis Weinstein

[57] ABSTRACT

A photographic flash device includes a bar-like flash discharge tube for emitting light, and a reflector having a rectangular-shaped opening for irradiating light beams emitted from the flash discharge tube toward and through the rectangular-shaped opening. The dimension of the depth of opposing side wall portions of the reflector for reflecting light beams along the long side of the opening of the flash discharge tube is longer than that of an inner part of the reflector whose cross section is a curved surface nearly substantially semi-elliptical in shape, which cross section covers the flash discharge tube. Light beams directed beyond an angle of view are reflected by the elongated opposing side wall portions so that they are kept within the angle of view. The opposing extreme edge portions of the upper and lower reflection plates along the long side of the opening of the reflector are extended toward the front by means of parallel flat reflection plates whose inner surfaces are reflective.

21 Claims, 4 Drawing Sheets

PHOTOGRAPHIC FLASH DEVICE

BACKGROUND OF THE INVENTION

1. Field of the Invention

The present invention relates to a photographic flash device and, more particularly, to a reflector in a light emission section of a photographic flash device used in a camera.

2. Description of the Related Art

An example of a light emission section of a conventional photographic flash device is shown in FIGS. 6 and 7. As is well known, the conventional photographic flash device comprises a bar-like, straight-tube-shaped flash discharge tube 11; a reflector 12, disposed so as to cover the discharge tube 11, which reflector is formed of a reflection cap, the front side of reflector 12 being open and in the shape of a rectangle; and a diffusion plate (not shown) disposed to face the opening of the reflector 12.

The flash discharge tube 11 is formed of what is commonly called a xenon flash discharge lamp, in which tube xenon gas is sealed. A high voltage is applied to an anode 11a and a cathode 11b, which face each other, and a high trigger pulse voltage is applied to a trigger electrode thereof, so that the tube 11 emits flash light.

As shown in FIG. 6, a cross section (a longitudinal cross section) of the reflector 12 along the short side thereof is formed into a curved surface nearly semi-elliptical in shape, the front side thereof being open. As shown in FIG. 7, a plane shape of the reflector is a trapezoid or almost a trapezoid, and is formed into a transversely elongated bucket along the long side of the reflector 12. The flash discharge tube 11 is mounted so as to be positioned near the focal position of the curved surface nearly semi-elliptical in shape and along the long side of the reflector 12 in the inner surface thereof, which reflector is formed of an aluminum alloy. Therefore, when the flash discharge tube 11 emits light, the light is reflected by the inner surface of the reflector 12 and irradiated forward from a front open portion 12a having a perimeter the shape of a rectangle.

The size of the reflector 12 constructed as described above is set so that, as shown in FIG. 6, an angle between two lines 13a and 13b which connect opposing end portions of extreme edge portions of the reflector 12 and a central light emission portion of the flash discharge tube 11 is set at an angle equal to the angle of view of a photographic lens of a camera, or slightly greater than this angle. This makes it possible for almost all of the light to be irradiated within the angle of view W, thus achieving efficient illumination. For this purpose, it is preferable that the reflection surface of the inner surface of the reflector 12 be shaped to be a semi-ellipse as regards the shape of the cross section along the short side of the reflector 12. Since the flash discharge tube 11 is positioned near the focal position of the semi-ellipse of the reflector 12, regarding the light emission from the flash discharge tube 11, both the light which is emitted forward directly from the front open portion 12a and light which is reflected by the inner surface of the reflector 12 and emitted forward from the front open portion 12a can be kept within the angle of view W.

A zoom flash device in which an irradiation angle can be adjusted at will is disclosed in Japanese Laid-Open Utility Model Application Hei/2(1990)-48934. This device is designed as follows: a flash discharge tube and a reflector disposed so as to cover the flash discharge tube are disposed so as to be movable backward and forward in the direction of the optical axis behind a lens provided in a case. The flash discharge tube and the reflector are brought close to the lens to obtain a wide irradiation angle, and the flash discharge tube and the reflector are moved away from the lens to obtain a relatively narrow irradiation angle. This zoom flash device is further provided with a reflection frame having a reflection surface in such an inner surface thereof as to enclose the reflector along the inner peripheral edge of the lens, so that when the flash discharge tube and the reflector are moved away from the lens, light beams, from among the light beams which go out from the reflector, which do not directly reach the lens, are reflected by the reflection surface of the reflection frame and made to travel toward the lens.

However, the reflector of the conventional flash device shown in FIGS. 6 and 7 constructed in the above-described way has drawbacks described below. In the reflector 12, as shown in FIG. 7, light beams 13c and 13d which go beyond the angle of view W inevitably remain along the long side of the reflector 12 because of its length.

To prevent this phenomenon, it is desirable that the depth of the reflector be made great and that the distance between the front open portion 12a of the reflector and the flash discharge tube 11 be increased. However, these dimensions are automatically determined on the basis of the shape along the short side of the reflector 12. In a camera, in particular, one using a wide-angle lens, the depth of a curved surface nearly semi-elliptical in shape tends to be small, and thus light beams going out along the long side of the reflector become larger and larger. That is, in the conventional reflector shown in FIGS. 6 and 7, satisfactory light distribution can be obtained along the short side of the reflector, but light cannot be controlled along the long side thereof and thus a large number of light beams go beyond the angle of view W. The dimension of the depth of the reflector depends upon the curved surface of the cross section along the short side of the reflector 12. The depth becomes small when an attempt is made to obtain light distribution for a wide-angle lens, and therefore light is wasted more along the long side of the reflector than the short side thereof.

No mention as to light wasted along the long side of the reflector is made in Japanese Laid-Open Utility Model Application Hei/2(1990)-48934 disclosing the zoom reflector device.

SUMMARY OF THE INVENTION

A main object of the present invention is to provide a photographic flash device which is capable of minimizing light beams going beyond an angle of view along the long side of a reflector regardless of the shape of the reflector.

Another object of the present invention is to provide a photographic flash device in which the reflector reflects light beams going beyond an angle of view of the light beams emitted from a flash discharge tube so as to keep the light beams within the angle of view.

In summary, according to the present invention, the photographic flash device, of which a front opening portion for irradiating light thereof has a perimeter which is formed into the shape of a rectangle, comprises: a reflector, a cross section (a longitudinal cross section) along the short side thereof being formed into a curved surface nearly semi-elliptical in shape; and a straight-tube-type flash discharge tube for emitting light disposed near the focal position of the curved surface, nearly semi-elliptical in shape, within the reflector and along the long side thereof, opposing side wall portions of the reflector, which reflector is disposed near the opposing end portions of the flash discharge tube for reflecting light along the long side of the discharge tube, are made longer than the dimension of the depth of the curved surface, nearly semi-elliptical in shape, of the reflector, and light beams going beyond the angle of view are reflected by the opposing side wall portions which are made large so as to be kept within the angle of view. The upper and lower extreme edge portions of the reflector facing each other along the long side of the reflector are extended forward using parallel flat reflection plates, the inner surfaces of which are formed of reflection surfaces.

According to the present invention, since light beams which are emitted forward in the longitudinal direction of the flash discharge tube are reflected by the opposing side wall portions and these light beams can be efficiently collected and irradiated from the front opening, the light distribution characteristics of a flash can be improved and the guide number can be increased. Thus, a photographic flash device which can efficiently perform irradiation and in which drawbacks of a conventional flash device are eliminated can be provided.

The above and further objects and novel features of the invention will be more apparent from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
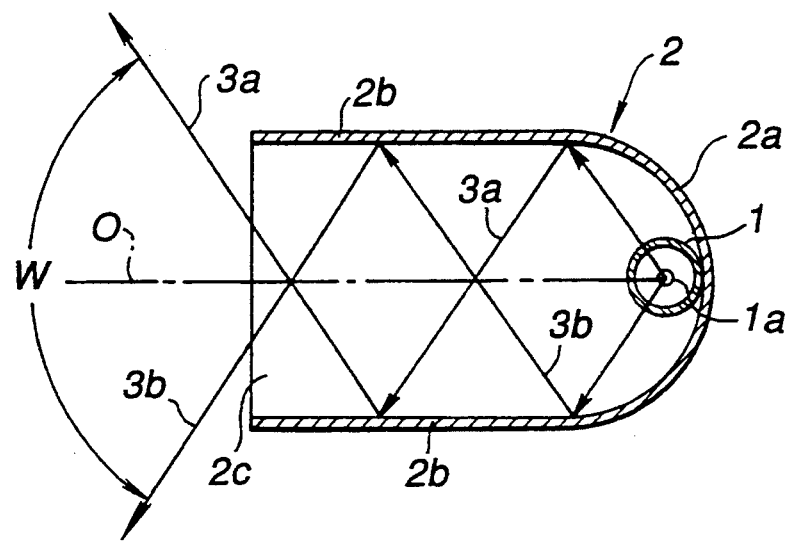
FIG. 1 is a longitudinal sectional view of a light emission portion of a photographic flash device in accordance with a first embodiment of the present invention.
Figure 2:
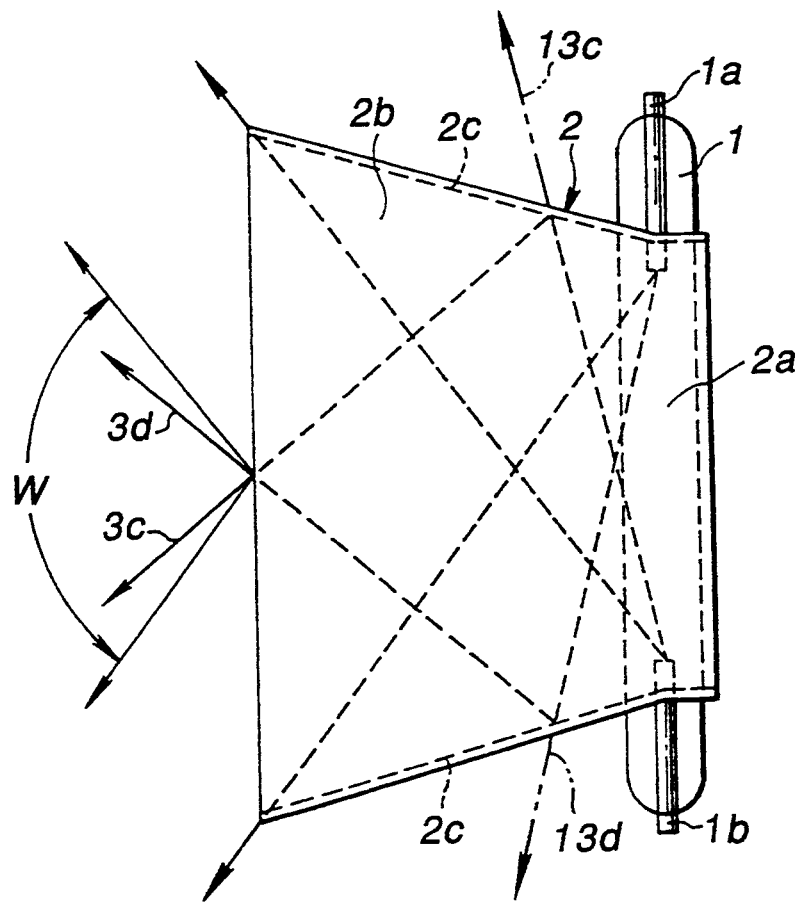
FIG. 2 is a plan view of the light emission portion of the photographic flash device in accordance with the first embodiment.
Figure 3:
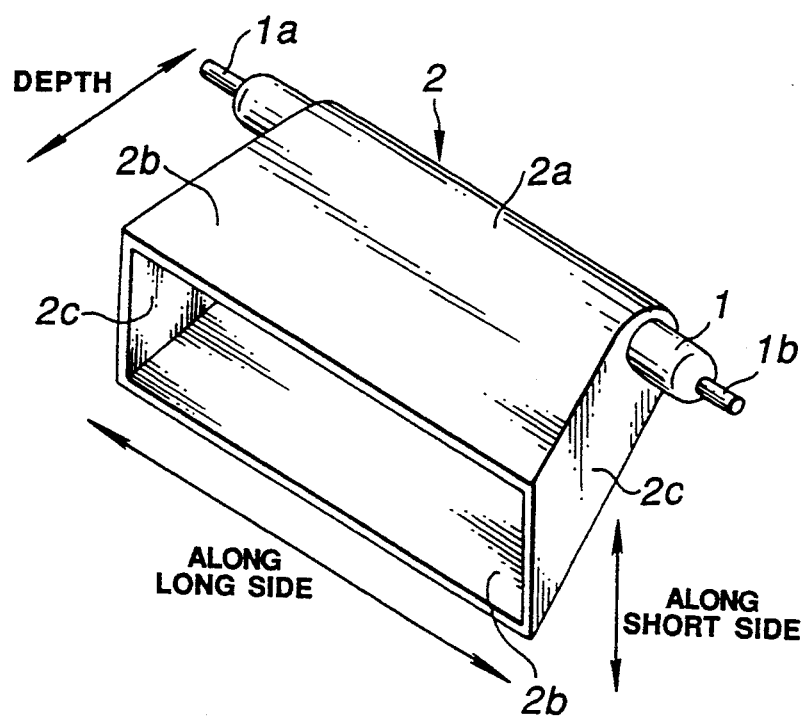
FIG. 3 is a perspective view of the light emission portion of the photographic flash device in accordance with the first embodiment.

FIGS. 1 to 3 illustrate the essential portion of a light emission portion of a photographic flash device in accordance with the first embodiment of the present invention.

A reflector 2 in accordance with the first embodiment is formed of an aluminum alloy. The front opening portion thereof for emitting light has a perimeter which is formed into a transversely elongated rectangular shape, and a cross section (a longitudinal cross section) along the short side of the reflector in an inner part 2a of the inside thereof where a flash discharge tube 1 for emitting light is disposed is formed into a curved surface nearly semi-elliptical in shape. The upper and lower opposing extreme end portions along the length of the reflector 2 are extended toward the front by means of parallel flat reflection plates 2b, whose inner surfaces are reflective. The extended parallel flat reflection plates 2b and the sides on the right and left of the inner part 2a, formed into a curved surface nearly semi-elliptical in shape, are covered with opposing wall portions 2c.

In the opposing wall portions 2c, the side surfaces on the right and left of the inner part 2a are also extended to the extreme edge portions of the flat reflection plates 2b. The opposing wall portions 2c are formed of opposing flat plates in the back half of the flash discharge tube 1. The portions extending forward from the flash discharge tube 1 are inclined so that the distance between the opposing plates increases in order to cover the angle of view W of the photographic lens. In other words, the reflector 2 is formed into a horn shape by four planes. Therefore, the reflector 2 has a dimension of a depth of the upper and lower, and right and left thereof such that the dimension of the depth of the flat reflection plates 2b is added to the dimension of the depth of a curved surface nearly semi-elliptical in shape. The length of the reflector 2 is longer than that of the conventional reflector 12 shown in FIGS. 6 and 7.

The reflection surface of the reflector 2 constructed as described above has a mirror-surface-like reflection coating.

The straight-type flash discharge tube 1 for emitting light, having the anode 1a and the cathode 1b on both end portions facing each other, is disposed near the focal position of the portion substantially semi-elliptical in shape within the reflector 2 along the long side thereof.

Figure 7:
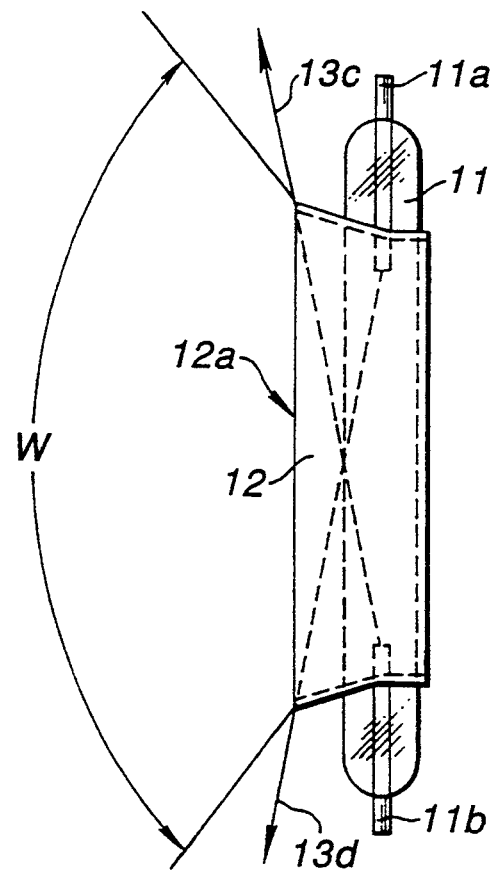
FIG. 7 is a plan view of the light emission portion of the conventional photographic flash device shown in FIG. 6.

In the photographic flash device with the reflector 2 in accordance with the first embodiment, the depth is increased regardless of the curved surface shape along the short side of the reflector 2 in the above-described way. When the flash discharge tube 1 emits light, the light beams 13c and 13d which go beyond the angle of view W of the conventional reflector as shown in FIG. 7, are reflected by the extended opposing wall portions 2c and become light beams 3c and 3d which go out forward from the front opening portion, as shown in FIG. 2, thus making it possible to increase the amount of light within the angle of view W.

Regarding light beams 3a and 3b which are emitted from the flash discharge tube 1 and reflected by the inner surface of the parallel flat reflection plates 2b, as shown in FIG. 1, the direction only thereof is reversed at the same angle as before and the beams go out forward from the front opening portion. The light beams reflected by the inner surface of the parallel flat reflection plates 2b, acting as a flash, hardly cause any changes in the light distribution characteristics if the two flat reflection plates 2b are disposed symmetrically to the emission optical axis O of the flash discharge tube 1. The light beams slightly attenuate depending solely upon the reflectance of the reflection surface.

Figure 4:
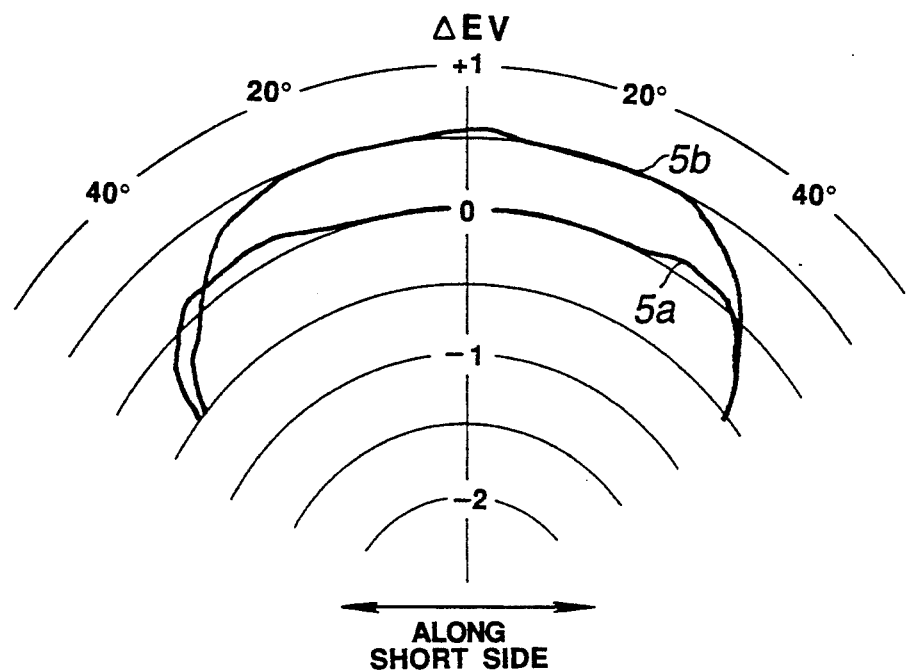
FIG. 4 illustrates the light distribution characteristics along the short side of a reflector, produced by the light emission portion of the photographic flash device in accordance with the first embodiment.
Figure 5:
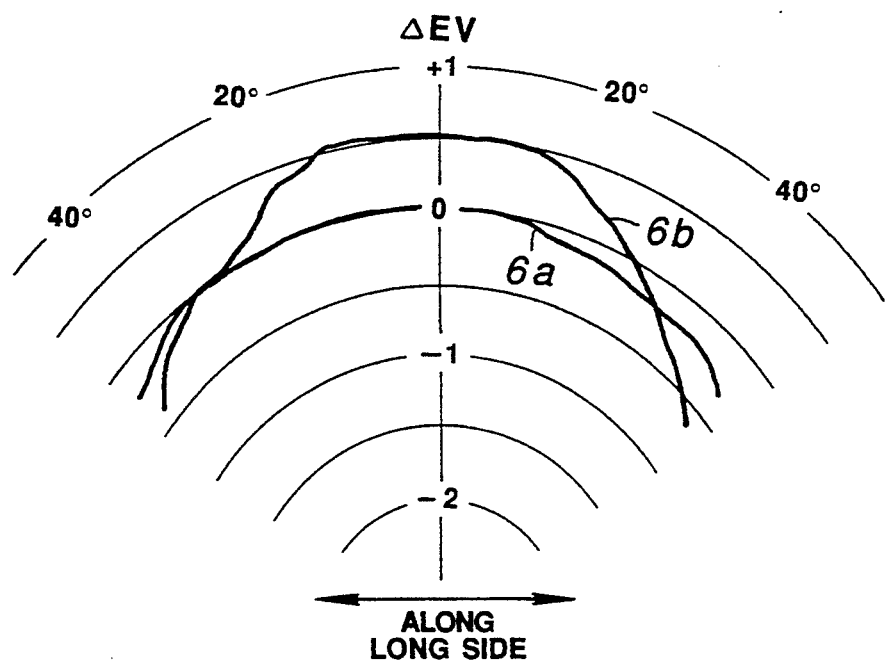
FIG. 5 illustrates the light distribution characteristics along the long side of the reflector, produced by the light emission portion of the photographic flash device in accordance with the first embodiment.

FIGS. 4 and 5 illustrate the results of an experiment using the actually manufactured reflector 2 in accordance with the first embodiment. FIG. 4 illustrates the light distribution characteristics along the short side of the opening of the reflector 2, and FIG. 5 illustrates the light distribution characteristics along the long side of the opening of the reflector 2.

Figure 6:
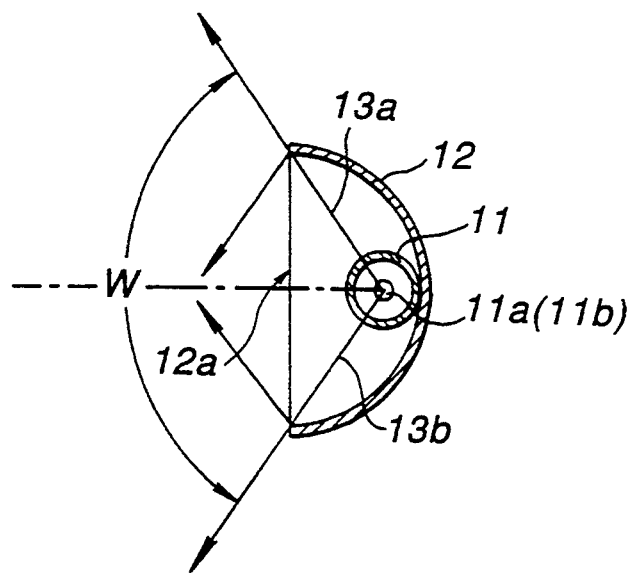
FIG. 6 is a sectional view illustrating a light emission portion of a conventional photographic flash device.

In FIG. 4, a curved line 5a indicates the light distribution characteristics of the conventional reflector 12 shown in FIG. 6, and shows the light distribution characteristics of a reflector for a wide-angle lens aimed at maintaining the amount of light in the center at not more than −1 EV in a range of ±45 degrees with respect to the center. A curved line 5b indicates the light distribution characteristics of the reflector 2, to which the present invention is applied, in which the depth shown in FIG. 1 is increased. As can be seen from these characteristics, light distribution characteristics do not vary much and are brighter by approximately 0.5 EV.

In FIG. 5, a curved line 6a indicates the light distribution characteristics of the conventional reflector 12 shown in FIG. 7. In this light distribution from the center to the periphery, there is no decrease in the amount of light. This indicates that light is hardly collected and it is scattered because the depth is small.

In contrast, the curved line 6b indicates the light distribution characteristics of the reflector 2, to which the present invention is applied, in which the depth shown in FIG. 2 is increased. The amount of light is decreased as compared with the curved line 6a in the region of 40 degrees, but the amount of light near the center is greater by approximately 0.5 EV, an amount corresponding to the decrease.

In the above experiment, when the depth dimension of the reflector was changed from 2.6 mm as in the related art to 7 mm, not much difference in the light distribution characteristics was seen, and guide number GNo. See pages 1294-1296 of the Encyclopedia of Practical Photographer, Volume 7, Flo-Gum was increased by 20 percent.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A photographic flash device having a straight-type flash discharge tube comprising:

a hollow reflector having a reflective surface whose center portion is a curved surface and whose side surfaces are flat surfaces substantially parallel to one another and integral with and extending forwardly from said curved surface, the curved surface and side surfaces collectively forming a U-shaped configuration;

end surfaces closing opposite ends of said reflector to form a hollow, substantially rectangular-shaped interior, forward edges of said side surfaces and said end surfaces lying in a common plane and defining a front open portion thereof for emitting light and having a rectangular-shaped perimeter, the forward edges of the side surfaces being longer in length than the forward edges of said end surfaces, said curved surface being substantially semi-elliptical in shape, said front open portion emitting light from said flash discharge tube which is disposed parallel to and near a focal position of said curved surface located inside of the hollow reflector and is substantially parallel to said side surfaces, said reflector side surfaces having a length measured in a direction parallel to a longitudinal axis of said flash tube, and adjacent said flash tube, which is less than a length of said reflector measured along free edges of said reflector side surfaces and parallel to said flash tube longitudinal axis, the end surfaces being closer to one another at said curved surface and gradually increasing in separation distance in moving from said curved surface to the perimeter of said reflector.

2. A photographic flash device according to claim 1, wherein said end surfaces have an opening angle, when looking downward at a cross-section of the reflector parallel to said side surfaces and passing through said longitudinal axis, so that light beams aligned at an angle beyond an angle of view, from among light beams emitted from said flash discharge tube for emitting light, are reflected thereby so as to be reflected back within the angle of view.

3. A photographic flash device according to claim 1, wherein said end surfaces of the reflector relative to a plane perpendicular to said longitudinal axis and passing through a center of said flash tube are inclined relative to said flash tube longitudinal axis so that a distance between the end surfaces increases in moving toward the front open position and in a direction in which the light beams are emitted.

4. A photographic flash device having a straight-type flash discharge tube comprising:

a hollow reflector having a reflective surface whose center portion is a curved surface and whose side surfaces are flat surfaces substantially parallel to one another and integral with and extending forwardly from said curved surface to form a U-shaped configuration;

end surfaces closing opposite ends of said reflector to form a hollow, substantially rectangular-shaped interior, forward edges of said side surfaces and said end surfaces lying in a common plane defining a front open portion thereof for emitting light and having a rectangular-shaped perimeter, the forward edges of the side surfaces being longer in length than the forward edges of said end surfaces, said curved surface being substantially semi-elliptical in shape, said front open portion emitting light from said flash discharge tube which is disposed parallel to and near a focal position of said curved surface located inside of the hollow reflector and is substantially parallel to said side surfaces, said side surfaces extending forwardly of said flash discharge tube a distance sufficient to cause light beams directed at an angle beyond a given angle of view within the flash device to be reflected so as to be retained within an angle of view and said end surfaces being inclined at an angle relative to one another so that a distance therebetween increases when moving in a direction from a portion thereof adjacent said curved portion and moving toward said rectangular-shaped front opening.

5. A photographic flash device according to claim 4, wherein a reflective inner surface of each of said opposing side wall portions are each substantially planar.

6. A photographic flash device according to claim 4, wherein said flash discharge tube for emitting light is a xenon tube.

7. A photographic flash device according to claim 4, wherein said reflector is formed from an aluminum alloy material.

8. A photographic flash device according to claim 4, wherein a reflective inner surfaces of said opposing side wall portions have mirror-surface-like reflection coatings.

9. A photographic flash device having a straight-type flash discharge tube comprising:
- a hollow reflector having a reflective surface whose center portion is a curved surface and whose sides are flat surfaces substantially parallel to one another and integral with and extending forwardly from said curved surface to form a U-shaped configuration;
- end surfaces closing opposite ends of said reflector to form a hollow, substantially rectangular-shaped interior, forward edges of said side surfaces and said end surfaces lying in a common plane and defining a front open portion thereof for emitting light and having a rectangular-shaped perimeter, the forward edges of the side surfaces being longer in length than the forward edges of said end surfaces, said curved surface being substantially semi-elliptical in shape, said front open portion emitting light from said flash discharge tube which is disposed parallel to and near a focal position of said curved surface located inside of the hollow reflector and is substantially parallel to said side surfaces, and
- said end surfaces each being aligned transverse to a longitudinal axis of the flash discharge tube.

10. A photographic flash device according to claim 9, wherein a distance between said opposing end surfaces, which are each inclined relative to said longitudinal axis, increases moving toward said perimeter so that light beams directed at an angle beyond an angle of view, from among light beams emitted from said flash discharge tube for emitting light, are reflected thereby so as to be retained within the angle of view.

11. A photographic flash device according to claim 9, wherein inner surfaces of said side surfaces are each substantially planar and reflective.

12. A photographic flash device according to claim 9, wherein said flash discharge tube for emitting light is a xenon tube.

13. A photographic flash device according to claim 9, wherein said reflector is formed from an aluminum alloy material.

14. A photographic flash device according to claim 9, wherein the reflective inner surfaces of said opposing side wall portions have a mirror-surface-like reflection coating.

15. A photographic flash device having a straight-type flash discharge tube comprising:
- a hollow reflector having a reflective surface whose center portion is a curved surface and whose sides are flat surfaces substantially parallel to one another and integral with and extending forwardly from said curved surface to form a U-shaped configuration;
- end surfaces closing ends of said reflector, forward edges of said sides and said end surfaces lying in a common plane and defining a front open portion thereof for emitting light and having a rectangular-shaped perimeter, the forward edges of the sides being longer than the forward edges of said end surfaces, said curved surface being nearly semi-elliptical in shape, said flash discharge tube being disposed parallel to and near a focal position located inside of the hollow reflector and being substantially parallel to said side surfaces,
- said sides being formed by extending said curved surface forwardly so that light beams directed at an angle beyond an angle of view of a taking lens cooperating with the flash device, from among light beams emitted from said flash discharge tube, are reflected so as to be kept within the angle of view, and said end surfaces being inclined so that a distance therebetween increases toward said perimeter, opposing inner surfaces thereof being reflective.

16. A photographic flash device according to claim 15, wherein said flash discharge tube for emitting light is a xenon tube.

17. A photographic flash device according to claim 15, wherein said reflector is formed from an aluminum alloy material.

18. A photographic flash device according to claim 15, wherein the reflective inner surface of each of said opposing side wall portions have a mirror-surface-like reflection coating.

19. A photographic flash device having a bar-like flash discharge tube for emitting light and a reflector for reflecting light beams emitted from the flash discharge tube toward a rectangular-shaped open end of the reflector, comprising:
- said reflector having a closed end opposite said open end, said closed end being a curved reflective surface closing said closed end and having a focal position, said tube having a longitudinal axis lying parallel to and near said focal position, said open end having a pair of reflection surfaces extending along long sides of the open end and extending parallel to a longitudinal axis of the discharge tube and a pair of reflection surfaces extending along short sides of the open end which are transverse to the discharge tube and the long sides, and said pair of reflection surfaces along the long sides of the open end being formed of parallel planar members and said pair of reflection surfaces along the short sides of the open end being formed of non-parallel planar members.

20. A photographic flash device according to claim 19, wherein said flash discharge tube for emitting light is a xenon tube.

21. A photographic flash device according to claim 19, wherein said reflector is formed from an aluminum alloy material.

* * * * *

UNITED STATES PATENT AND TRADEMARK OFFICE
CERTIFICATE OF CORRECTION

PATENT NO. : 5,394,307
DATED : February 28, 1995
INVENTOR(S) : Keisuke Matsuura

It is certified that error appears in the above-indentified patent and that said Letters Patent is hereby corrected as shown below:

At column 3, line 42, delete "plan" and replace with --plane--.

At column 3, line 59, delete "plan" and replace with --plane--.

At column 5, lines 12-13, delete "not more than -1 EV" and replace with --not less than -EV--.

At column 5, line 39, delete "GN0" and replace with --GN--.

At column 5, line 40, delete "Photographer" and replace with --Photography--.

Signed and Sealed this

Twenty-fourth Day of October, 1995

Attest:

BRUCE LEHMAN

*Attesting Officer*  *Commissioner of Patents and Trademarks*